(12) United States Patent
Balasaygun

(10) Patent No.: US 9,100,469 B2
(45) Date of Patent: Aug. 4, 2015

(54) SYSTEM AND METHOD FOR FOLLOWING A CALL

(75) Inventor: Mehmet Balasaygun, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 263 days.

(21) Appl. No.: 13/354,585

(22) Filed: Jan. 20, 2012

(65) Prior Publication Data

US 2013/0188787 A1   Jul. 25, 2013

(51) Int. Cl.
| | |
|---|---|
| *H04M 3/42* | (2006.01) |
| *H04M 3/22* | (2006.01) |
| *H04M 3/436* | (2006.01) |
| *H04N 7/14* | (2006.01) |

(52) U.S. Cl.
CPC .......... *H04M 3/2281* (2013.01); *H04M 3/4365* (2013.01); *H04N 7/147* (2013.01); *H04M 3/42093* (2013.01); *H04M 2203/2038* (2013.01)

(58) Field of Classification Search
CPC .......................... H04M 3/2281; H04M 3/4365
USPC ................................. 455/456.1; 379/201.01
See application file for complete search history.

(56) References Cited

U.S. PATENT DOCUMENTS

| | | | | |
|---|---|---|---|---|
| 8,204,199 | B2 * | 6/2012 | Jorasch et al. ........... | 379/207.04 |
| 8,280,015 | B2 * | 10/2012 | Milstein et al. ............ | 379/88.23 |
| 8,296,152 | B2 * | 10/2012 | Issa et al. ...................... | 704/275 |
| 8,310,959 | B2 * | 11/2012 | Helin et al. .................... | 370/259 |
| 2003/0112928 | A1 * | 6/2003 | Brown et al. ................. | 379/67.1 |
| 2005/0276277 | A1 * | 12/2005 | Pace .............................. | 370/465 |
| 2006/0248184 | A1 * | 11/2006 | Wu et al. ....................... | 709/224 |
| 2007/0047726 | A1 * | 3/2007 | Jabbour et al. ........... | 379/373.02 |
| 2008/0146198 | A1 * | 6/2008 | O'Leary et al. ............. | 455/412.2 |
| 2008/0268867 | A1 * | 10/2008 | Cadenas ..................... | 455/456.1 |
| 2010/0330960 | A1 * | 12/2010 | Ravishankar et al. ......... | 455/410 |
| 2011/0176667 | A1 * | 7/2011 | Kumar ...................... | 379/142.04 |
| 2012/0129556 | A1 * | 5/2012 | Tysowski ...................... | 455/466 |

\* cited by examiner

*Primary Examiner* — Sonia Gay
(74) *Attorney, Agent, or Firm* — Sheridan Ross P.C.

(57) ABSTRACT

A user who wants to follow a call made by or to a specific entity (typically a person) sends a request to be notified when the entity makes or receives a call. The call is an audio or video call. The call can be based on a specific subject that the user has identified. When the entity makes or receives a call, a call processor detects that the call has been made. In response to the call, a notification is sent to the user. If the user has defined a subject, the system determines if the call is on the subject. If the call is on the subject, the notification is sent. If the call is not on the subject, the notification is not sent.

22 Claims, 6 Drawing Sheets

| ALLOW TO RECEIVE NOTIFICATION? | | |
|---|---|---|
| SALLY | | ✓ |
| JOE | | ☐ |
| TED | | ☐ |

500

| NOTIFY TED OF CALL? | YES | ● |
|---|---|---|
| | NO | ○ |

502

| ALLOW TED TO RECEIVE NOTIFICATIONS OF CALLS? | YES | ● |
|---|---|---|
| | NO | ○ |

504

| ALLOW GROUPS TO RECEIVE NOTIFICATIONS? | YES | ● |
|---|---|---|
| | NO | ○ |
| SUPPORT GROUP A? | | ✓ |
| SUPPORT GROUP B? | | ☐ |

506

| ALLOW INDIVIDUALS TO RECEIVE NOTIFICATIONS BASED ON RANKING? | YES | ● |
|---|---|---|
| | NO | ○ |
| ENTER RANKING (1-10) TO ALLOW ACCESS TO NOTIFICATION? | 5 | |

SYSTEM AND METHOD FOR FOLLOWING A CALL

TECHNICAL FIELD

The system and method relates to audio or video calls and in particular to receiving a notification of an audio or video call.

BACKGROUND

In today's society of instant information, the amount of information that a person has to sort through daily is on the rise. This is compounded by the increase in different types of communication media, such as email, Instant Message (IM), audio communications, video communications, blog sites, and social networks. To deal with this information overload, there is an increasing demand for services that allow users to be notified of specific events that are of interest. This allows a user to not waste time sorting through different types of media to identify topics and conversations of interest. To deal with this issue, there are some services that attempt to solve this problem.

For example, Twitter® allows a user to be notified when someone posts a response on a blog as a tweet. However, this information is static in the sense that it is unidirectional. In many respects, it is similar to other Internet blogs that people can create without any interaction from the readers. Although systems like Twitter® meet a need, what is needed is a way to extend capability like this into audio and video communications that provide two-way communications. Being able to be notified of specific audio or video communication on a specific subject can improve a user's ability to sort through large amounts of information.

SUMMARY

The system and method are directed to solving these and other problems and disadvantages of the prior art. A user who wants to follow a call made by or to a specific entity (typically a person) sends a request to be notified when the entity makes or receives a call. The call is an audio or video call. The call can be based on a specific subject that the user has identified.

When the entity makes or receives a call, a call processor detects that the call has been made. In response to the call, a notification is sent to the user. If the user has defined a subject, the system determines if the call is on the subject. If the call is on the subject, the notification is sent. If the call is not on the subject, the notification is not sent.

A description of the call is used to determine if the call matches the defined subject. The description of the call can be determined from a variety of sources, such as a SIP header, a calendar event, a selection by the entity, a spoken phrase, a document, a subject line in an email or Instant Message, and the like.

The entity can be a person. The system can detect that a specific person is making a call using various authentication techniques, such as voice prints, facial recognition, passwords, finger prints, retinal scans, and the like. The entity can also be a device such as a telephone. If a call is made from the telephone (e.g., based on a telephone number) the user is notified of the call. A device can be identified using other mechanisms, such as IP addresses, email addresses, or any unique identifier.

An entity can elect to allow or not allow a notification. There are various ways the entity can do this. For example, the entity can determine who is notified upon the initial request from the user, at a time prior to the call, when the call is made, and the like. The entity can also select who will receive notifications using groups, rankings, a type of call, and a rating.

The system and method also allow for multiple users to register to each receive a notification when a call is made or received. The entity can elect specific users to receive the notification when the call is made or received.

BRIEF DESCRIPTION OF THE DRAWINGS

In order to describe the manner in which other advantages and features of the disclosure can be obtained, a more particular description of the principles and the best mode briefly described below will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 is a diagram of different ways to notify an entity.

In the appended Figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The following description and associated Figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
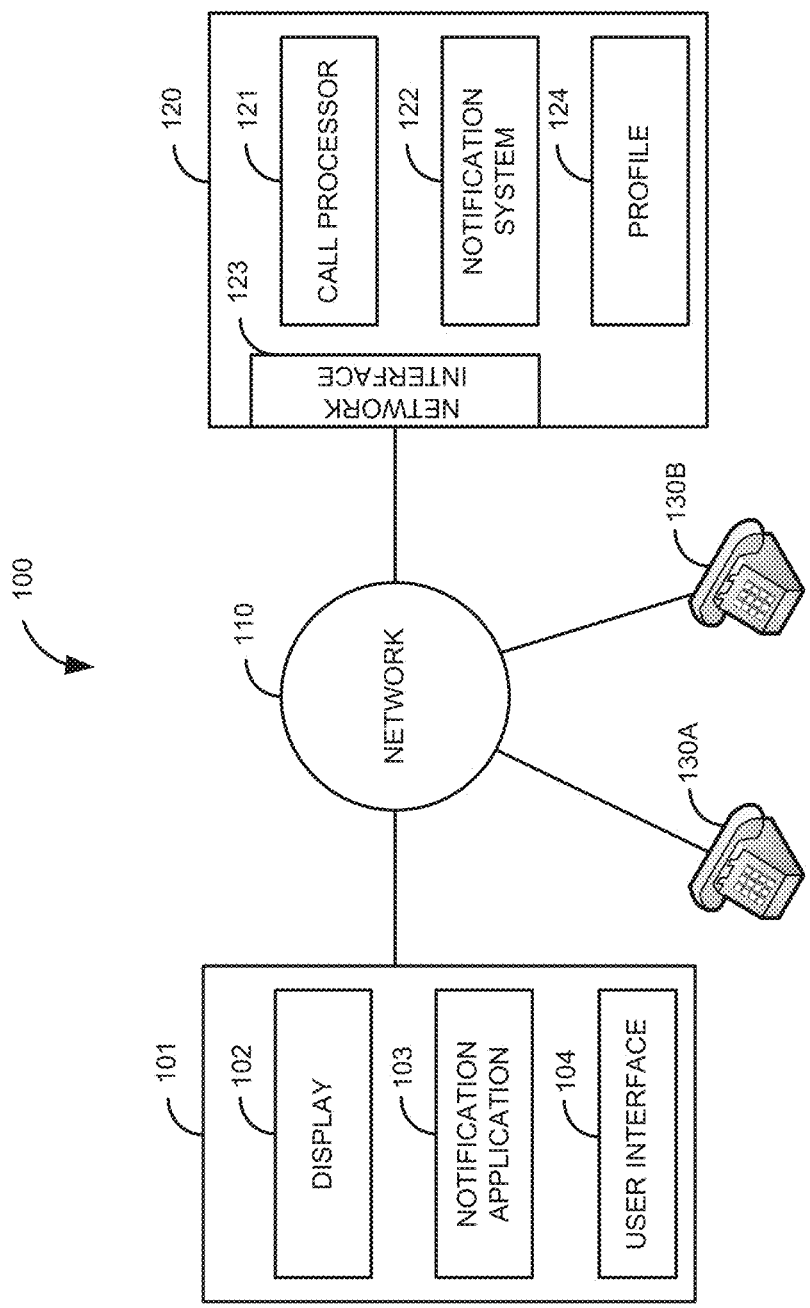
FIG. 1 is a block diagram of a first illustrative system for receiving a notification in response to a call.

FIG. 1 is a block diagram of a first illustrative system 100 for receiving a notification in response to a call. First illustrative system 100 comprises communication device 101, network 110, communication system 120, and telephones 130A-130B.

Communication device 101 can be any device that can communicate on network 110, such as a Personal Computer (PC), a tablet device, a cellular telephone, a telephone, a computer, and the like. Communication device 101 can be telephone 130. Communication device 101 further comprises display 102, notification application 103, and user interface 104. Display 102 can be any type of display, such as a Liquid Crystal Display (LCD), a plasma display, a Light Emitting Diode (LED) display, a cathode ray tube, a television, a touch screen, and the like. Notification application 103 could be any hardware/software that can receive a notification, such as an email client, a web browser, an Instant Message (IM) client, a software application, an operating system, and the like. User interface 104 can comprise a variety of components, such as a mouse, a keyboard, a keypad, a joystick, a touch screen, and the like.

Network 110 can be any network that can send and receive communications, such as the Internet, a Wide Area Network (WAN), a Local Area Network (LAN), the Public Switched Telephone Network (PSTN), a packet switched network, a circuit switched network, a cellular network, a combination of these, and the like. Network 110 can use a variety of protocols, such as Ethernet, Internet Protocol (IP), Session Initiation Protocol (SIP), Integrated Services Digital Network (ISDN), circuit switching protocols, 802.11, and the like.

Communication system 120 can be any system that can provide communication services, such as a switch, a central office switch, a Private Branch Exchange (PBX), a video switch, a video router, a router, and the like. Communication system 120 can provide a variety of communications in a variety of media, such as audio communications, video communications, email communications, Instant Message (IM) communications, text communications, Really Simple Syndication (RSS) feeds, social networks, and the like. Communication system 120 comprises call processor 121, notification system 122, network interface 123, and profile 124.

Call processor 121 can be any processor that can handle audio and/or video calls, such as a Private Branch Exchange, a video switch, a mixer, central office switch, and the like. Notification system 122 can be any system that can generate notifications, such as an email system, a software application, an Instant Messaging (IM) system, Twitter®, an audio communication system, a video communication system, and the like. Network interface 123 can be any hardware/software that can communicate with network 110. For example, network interface 123 can be an Ethernet card, a modem, an 802.11 card, a cellular interface, a broadband interface, a wireless interface, a wired interface, any combination of these, and the like. Profile 124 can be software/hardware that can store preference/configuration information. For example, profile 124 can be stored in a memory or on a disk. Profile 124 is used to keep track of an entity's preferences in terms of rating users who follow the entity. This allows the entity to block who is notified of the calls that the user makes. It also prompts the entity before notifying a follower or automatically notifies followers who are rated high by the entity. Additionally, it prompts the entity before any notification goes out to lower ranked followers and the like.

Telephones 130A-130B can be any type of device that can provide audio (or video) communication, such as a wired telephone, a wireless telephone, a cellular telephone, a softphone running on a Personal Computer, a tablet device, and the like. Telephones 130A-130B can communicate on network 110 via a variety of protocols, such as Plain Old Telephone Service (POTS), Integrated Service Digital Network (ISDN), Session Initiation Protocol (SIP), H.323, peer-to-peer protocols, video protocols, and the like.

A user of communication device 101 sends a request to be notified when an entity makes a call or receives a call. The call can be an audio or a video call. The entity can be a device, a person, a corporation, a group, an organization, and the like. A device could be a telephone, a cellular telephone, a Personal Computer (PC), a video terminal, a voice mail system, a television, a Private Branch Exchange (PBX), a switch, and the like. For example, the user of communication device 101 can make a request to be notified when a voice call is made to or by telephone 130A. A call by or to a device can be detected based on an off hook signal, a SIP Invite, a telephone number, an IP address, an email address, some type of unique identifier, and the like. The request to be notified is sent to notification system 122 via network interface 123. Notification system 122 receives the request to send the notification based on a call being made by or to the entity (e.g., telephone 130A). The request is stored in profile 124.

Call processor 121 receives an indication of the call being made by or to the entity. For example, assume that telephone 130A is the entity. A voice call is made from telephone 130A to telephone 130B. In response to the call being made, notification system 122 sends a notification of the call being made by the entity (130A). The notification may be sent to notification application 103. For example, notification application 103 can be an Instant Message (IM) application that alerts the user of communication device 101 via an IM alert that a call has been made from telephone 130A. In addition, the notification can be sent when a call is made from two or more devices such as telephones 130A and 130B.

The user of communication device 101A may then be able to join the voice call between telephones 130A and 130B. This can be accomplished by the user of communication device 101 clicking on a link in the IM (notification). Likewise, a similar notification process could be implemented using an email system. The way the user can be notified can be accomplished in various ways, such as via a voice call, via a video call, via a pop-up in notification application 103, via a text message, and the like.

Alternatively, where the entity is a person, the notification can be sent based on a call being made by or to a specific person(s). For example, the indication of the call being made can be based on detecting a voice print of a specific person making a call from a device such as telephone 130A or 130B. Other type of authentication can be used to indicate that a call is being made by or to a specific person, such as passwords, facial recognition, retinal scans, fingerprints, and the like.

Moreover, if the entity is a corporation, organization, or group, the notification can be based on a call associated with the corporation/organization/group. For example, a call from or to a specific telephone number of a corporation, a calendar event of an organization, a video conference of a group, and the like are events for which a user could request to be notified when a call is made.

Figure 2:
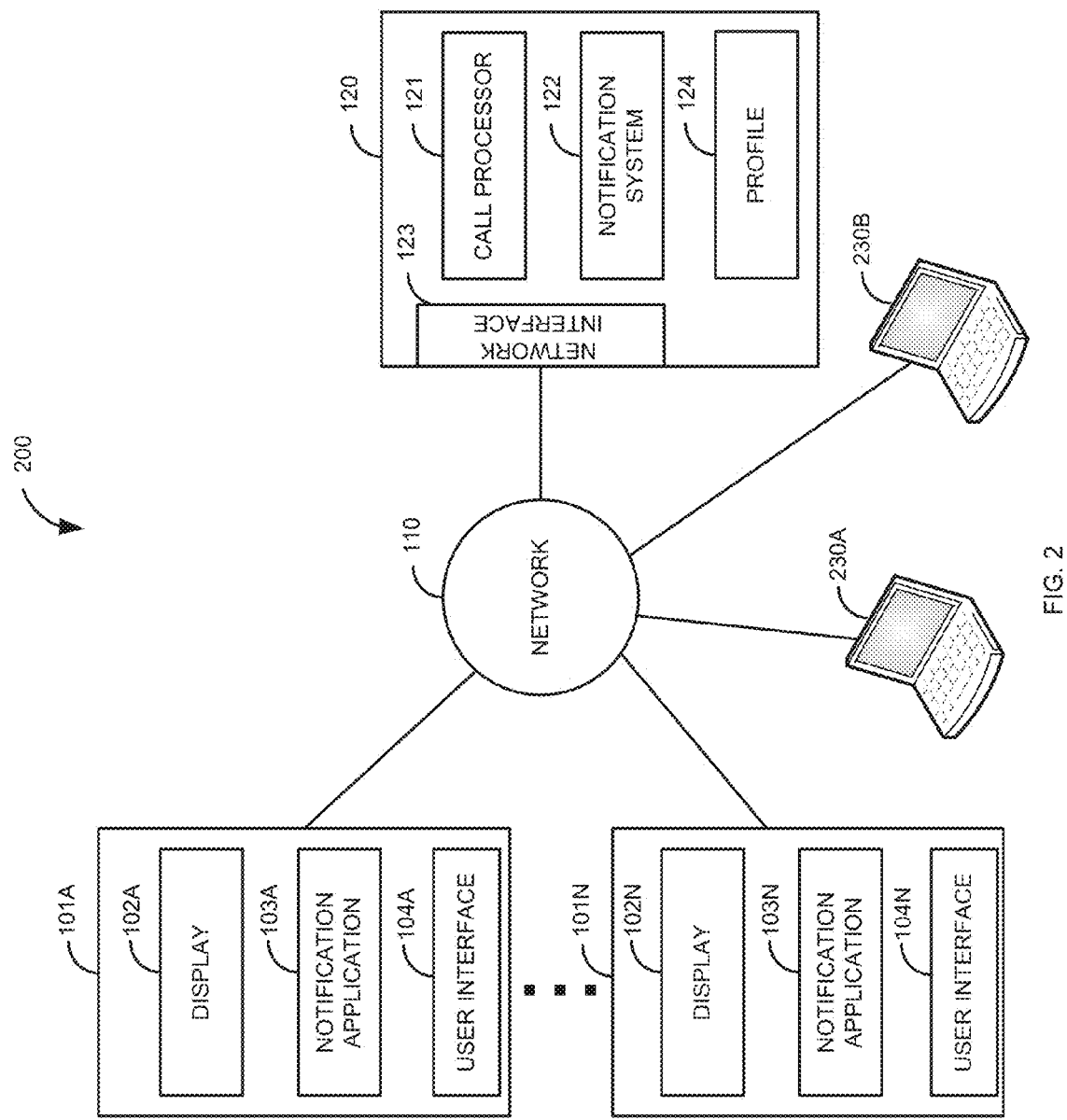
FIG. 2 is a block diagram of a second illustrative system for receiving a notification in response to a call.

FIG. 2 is a block diagram of a second illustrative system 200 for receiving a notification in response to a call. Second illustrative system 200 comprises communication devices 101A-101N, network 110, personal computers 230A-230B, and communication system 120. Communication devices 101A-101N further comprise display 102, notification application 103, and user interface 104.

Personal computers 230A-230B can be any device that can provide audio/video communications, such as a laptop computer, a tablet computer, a desktop computer, a cellular telephone, and the like. Personal computer 230 can be communication device 101. Communication system 120 comprises call processor 121, notification system 122, network interface 123, and profile 124.

Users of communication devices 101A-101N each send a request to be notified when an entity (personal computer 230A) makes a call or receives a call. The requests are sent to notification system 122 via network interface 123. Notification system 122 receives the requests to send the notification based on a call made by or to the entity (personal computer 230A in this example). The requests are stored in profile 124.

Call processor 121 receives an indication of a video call being made to personal computer 230A from personal computer 230B. In response to the call being received at personal computer 230A, notification system 122 sends notifications of the call being made to communication devices 101A-101N. The notifications can be sent in various ways. For example, a video call can be made to each communication device 101A-101N requesting that each communication device 101A-101N join the video call with personal computer 230A.

In an alternative embodiment, the entity (typically a person) can select individual users to send the notification to (after the indication of the call being made). How the entity selects specific users can be accomplished in a variety of ways. For example, the entity can select individual users to send the notification based on defined groups, rankings, a type of call (i.e., audio or video), a rating, and the like that have been defined in profile 124. The entity can also select which users will be notified based on a subject associated with the call. For example, the subject could be that the call is about investment options for a 401K.

Figure 3A:
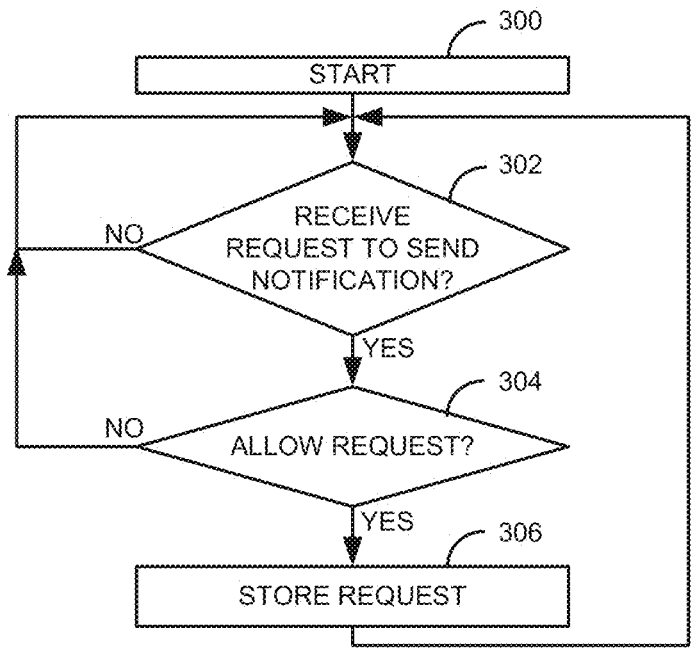
FIG. 3A is a flow diagram of a method for requesting a notification.

FIG. 3A is a flow diagram of a method for requesting a notification. Illustratively, communication devices 101, communication system 120, telephones 130, and Personal Computers 230 are stored-program-controlled entities, such as a computer or processor, which performs the method of FIGS. 3A, 3B, 4A, and 4B and the processes described herein by executing program instructions stored in a tangible computer readable storage medium, such as a memory or disk.

The process starts in step 300. Notification system 122 determines in step 302 if a request is received (from communication device 101) to send a notification based on a call being made by or to an entity. If a request has not been received in step 302, the process goes to step 302. Otherwise, if a request has been received in step 302, notification system 122 provides in step 304 a way for the entity to indicate whether or not to allow the request to receive the notification of the call made by or to the entity. This can be accomplished in various ways. For example, a pop-up notification (i.e., like shown in FIG. 5 window 504) could be displayed to the entity (a person) and the person could select to allow the user to receive the notification. The entity could be notified in other ways such as via an Interactive Voice Response (IVR) system. If the entity does not allow the request in step 304, the process goes to step 302. Step 304 may be optional based on information defined in profile 124. Otherwise, if the entity allows the request in step 304, notification system 122 stores information associated with the request in profile 124 and the process goes to step 302.

Figure 3B:
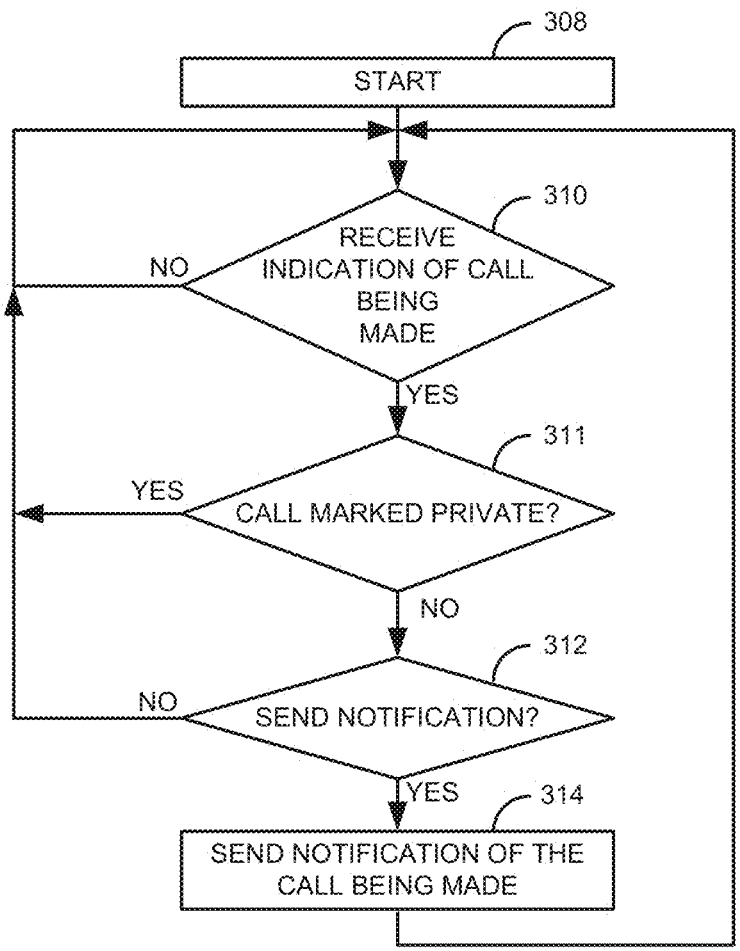
FIG. 3B is a flow diagram of a method for being notified when a call is made.

FIG. 3B is a flow diagram of a method for being notified when a call is made or received. The process starts in 308. Call processor 121 determines in step 310 if an indication of a call being made has been received. If an indication of a call has not been made by or to the entity in step 310, the process goes to step 310. Otherwise, if an indication of a call has been made by or to the entity in step 310, the process determines in step 311 if the entity has marked the call private. A call can be made private based on a per-call or per-user basis. If the call has been marked private by the entity in step 311, the process goes back to step 310. Otherwise, if the entity has not marked the call private in step 311, the process can optionally determine in step 312 if the entity wants to allow sending of the notification. If the entity indicates not to send the notification in step 312, the process goes to step 310. The way that the entity can indicate whether or not to send the notification can be accomplished in various ways. For example, the entity could select whether to send a notification via windows 500 or 502 in FIG. 5. Other embodiments could be provided via an IVR system. If the entity indicates in step 312 to send the notification, the notification (or notifications if there are multiple users who requested to be notified) is sent in step 314 and the process goes to step 308.

Alternatively, based on profile 124, the notification can be sent automatically based on a rating of a user (eliminating step 312). For example, the entity could rate a user based on a scale of 1-10 (i.e., like shown in FIG. 5 window 508). The user can define a rating of five for a specific call. If the user is not rated a five or higher for the specific call, the user is not notified of the call. The rating could also be based on a subject associated with a call. The entity could rate a user differently based on the subject of a call. For example, the entity could rate the user a five on subject one and an eight on subject two. The rating could determined automatically based on information about the user, such as posts on blogs, how people respond to the user, and the like.

Alternatively, as part of the notification process of FIG. 3B, a user can create a policy that upon receiving the indication that the call has been made by the entity in step 310, the user will be automatically joined to the call (notification step 314). However, the entity still has the ability to override the user being automatically joined into the call in step 312. For example, if the call is a voice call, the user will automatically be joined to the voice call as long as the entity allows the user to be notified in step 312.

Other embodiments can include allowing the entity to add additional users to an ongoing call or to be notified of the call. The entity can also retag the description of an ongoing call with the purpose of notifying a new user or group of users. Notification system 122 can detect the change. For example, the topic (description) of a call could change over the course of the call; based on the topic changing, a new group of users who have registered to be notified when the call changes to the new topic are notified. To accomplish this, step 310 can be modified to detect a change in the description in an ongoing call (either done by the entity or based on a time frame). If there is a detection of a change in the description in step 310, the process goes to step 311. Otherwise, if there is not a detection of a change in the description in step 310, the process goes to step 310. The process of FIG. 4B, which is described later, determines if the description matches a defined subject.

Figure 4A:
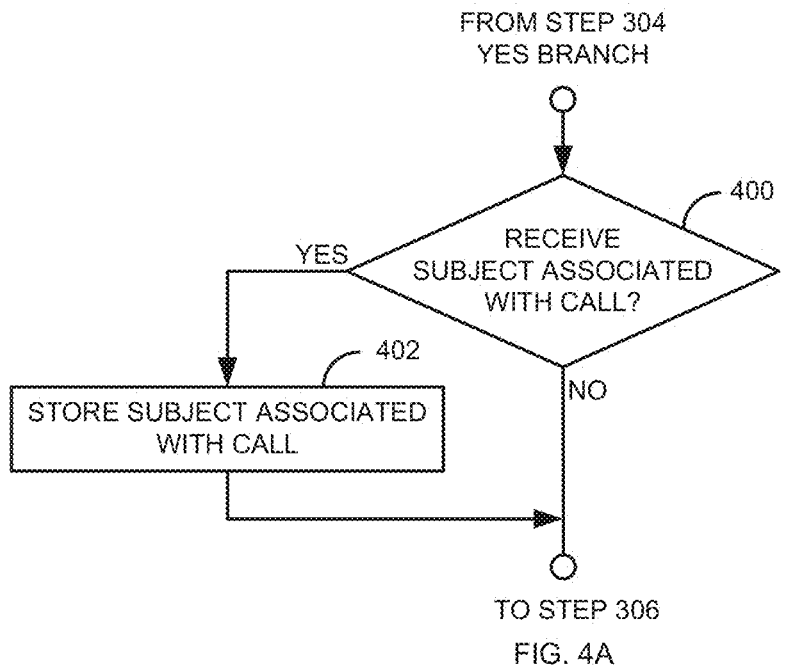
FIG. 4A is a flow diagram of a method for receiving and storing a subject associated with a call.

FIG. 4A is a flow diagram of a method for receiving and storing a subject associated with a call. The process described in FIG. 4A can optionally go between steps 304 and 306 in FIG. 3A.

After allowing the request in step 304, notification system 122 determines if a subject associated with the call was received in step 400. The subject can be received along with the notification request (step 302) or as a separate response. The subject associated with the call can indicate information about the call that can be used to filter out notifications if the actual call is about a different subject. The subject can include information such as different subjects to be discussed, a time of when a subject will be discussed, documents that will be discussed, calendar events, and the like. The time of when a subject is discussed can be used as a basis for sending the notification to the user. The subject can be defined by the user making the request and/or by the entity. If there is no subject associated with the call received in step 400, the process goes to step 306. Otherwise, if there was a subject associated with the call received in step 400, the process stores 402 the subject associated with the call in step 402 and the process goes to step 306.

Figure 4B:
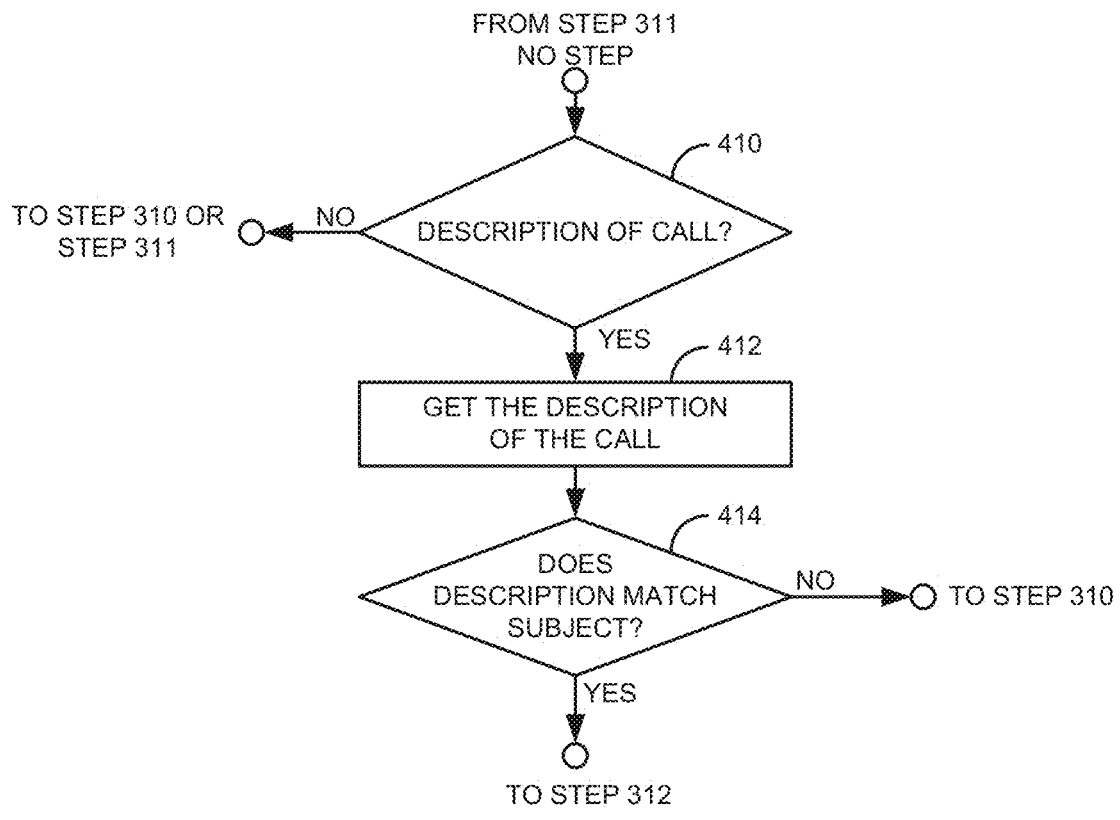
FIG. 4B is a flow diagram of a method for determining if a description of the call matches a subject associated with the call.

FIG. 4B is a flow diagram of a method for determining if a description of the call matches a subject associated with the call. The process described in FIG. 4B can optionally go between step 311 and 312. After step 311 (no branch), notification system 122 determines if there is a description of the call in step 410. If there is not a description of the call in step 410, the process goes to step 310 or 311 based on how the entity has configured the system in profile 124.

Otherwise, if there is a description of the call in step 410, notification system 122 gets 412 the description of the call. The description of the call can come from a variety of sources, such as from a Session Initiation Protocol (SIP) header, a calendar event, a selection by the entity, a spoken phrase, a document, a subject line in an email, a subject line in an Instant Message (IM), and the like. Notification system 122 determines in step 414 if the subject associated with the call matches the description of the call. If the subject does not match the description in step 412, the process goes to step 310. Otherwise, if the subject matches the description in step 414, the process goes to step 312.

FIG. 5 is a diagram of different ways to notify a user. FIG. 5 comprises windows 500, 502, 504, 506, and 508. Windows 500, 502, 504, 506, and 508 are different windows that can be displayed to an entity. Windows 500, 502, 504, 506, and 508 provide various options for the entity to control which users are notified of a call.

Window 500 can be displayed to an entity when multiple users have requested to be notified and an indication of the call has been detected by call processor 121 (steps 310 and 312). In this illustrative example, three users (Sally, Joe, and Ted) have requested to be notified upon initiation of the call. As the call is made or received, the entity (assuming that it is a person) can then select which of the three users will receive notifications. In this example, if the entity approves (i.e., by clicking an approval button (not shown)), only Sally will receive the notification. Window 500 could also indicate a subject (if there was one) associated with the notification.

Similarly, window 502 is displayed to the entity when there is only a single user that has requested to be sent a notification (steps 310 and 312). In this example, Ted will be notified if the entity approves. Window 502 could also indicate a subject if the user (Ted) had indicated a subject when setting up the notification. In this example, if the entity approves (i.e., by clicking an approval button (not shown)), Ted will receive the notification.

Windows 500 and 502 can optionally be displayed based on preferences defined in profile 124. Windows 500 and 502 can also be displayed based on other attributes. For example, preferences can be used to determine the time when windows 500 and 502 are displayed. Windows 500 and 502 can be displayed 5 minutes before a meeting defined in a calendar event that indicates that the entity will be making a call. The preferences could also define the windows (500 and 502) to be displayed automatically or not at all.

Window 504 is displayed to the entity when a user requests to be notified based on a call being made by or to the entity in step 304. In this example, the entity can allow the user (Ted) to be notified by selecting "Yes" or to not be notified by selecting "No." Window 504 could also indicate a subject if the user (Ted) had indicated a subject when setting up the notification. In this example, if the entity approves (i.e., by clicking an approval button (not shown)), Ted will be allowed to receive the notification.

Window 506 is displayed to the entity when the entity has set up groups to receive notifications. In this exemplary embodiment, the entity can select if groups can receive notifications and specify groups that can receive notifications. Although not shown, window 506 could also include the ability to set up groups for a specific subject. In this example, if the entity approves (i.e., by clicking an approval button (not shown)), only Support Group A will be allowed to receive the notification.

Window 508 is displayed to the entity for setting up the ability to allow rankings to be used when sending out notifications. The entity can indicate whether a ranking is used and what level the ranking is. If a user has been defined at a level that is equal to or higher than the ranking indicated by the entity, the user will be notified. The ranking can be based on a subject and for a specific user. The ranking level also can be defined for each subject. For example, the entity may rank a user higher on video discussions, but rank the user much lower on corporate strategy discussions. The entity can define a ranking of 5 for video discussions and a ranking of 8 for corporate strategy discussions. The information selected in window 508 can be stored in profile 124. In this example, if the entity approves (i.e., by clicking an approval button (not shown)), a ranking of five will be used for all notifications.

Figure 6:
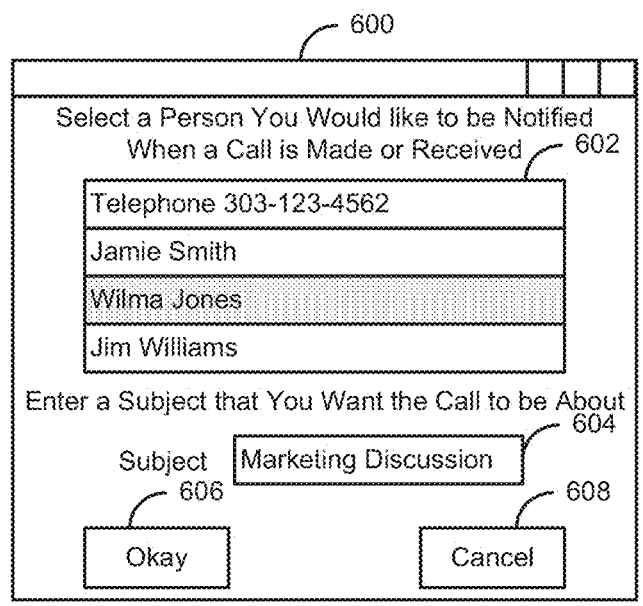
FIG. 6 is a diagram of a window for a user to register to be notified upon an indication of a call.

FIG. 6 is a diagram of a window 600 for a user to register to be notified upon an indication of a call. Window 600 comprises entity list 602, subject box 604, okay button 606, and cancel button 608. Window 600 is used by a user to select a specific person that the user wants to be notified when a call is made or received.

The user selects a specific entity (or entities) by selecting an entity from entity list 602. In this example, the user has selected Wilma Jones. The user has also indicated a subject of "Marketing Discussion." The user can click okay button 606 to send the request to receive a notification to notification system 122 when Wilma Jones makes a call or receives a call about "Marketing Discussion." The user can also close window 600 by clicking on cancel button 608.

Likewise, the user could select "Telephone 303-123-4562" to be notified when a call is made to or received from telephone 303-123-4562. This will happen regardless of who makes or receives the call.

If the user only wanted to be notified based on a made call and not a received call to Wilma Jones, a button could be added to FIG. 6 (not shown) where the user could select this option. The option could be for all entities or only for specific entities in entity list 602.

Notification system 122 can determine if the subject matches in various ways. For example, notification system 122 can use an exact word match to a subject in a SIP header. Notification system 122 can use other methods to identify a match, such as synonyms, or other defined words. For example, notification system 122 could use a subject from a calendar invite that says "Marketing Meeting" to indicate a match with the subject of "Marketing Discussion" based on defined lists or a variety of algorithms.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated Figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving at a notification system, a request from a first entity to send a notification based on a call made by or to a second entity, wherein the call is an audio or video call;
   receiving at a call processor, an indication of the call being made by or to the second entity;
   responsive to receiving the indication of the call being made by or to the second entity, providing a selection control option to the second entity, the selection control option including at least one option for selectively allowing or denying the request from the first entity;
   determining, based on a selection of the at least one option provided via the second entity, that the second entity allows the request from the first entity; and
   responsive to receiving the selection provided via the second entity, sending by the notification system, a notification to the first entity of the call being made by or to the second entity.

2. The method of claim 1, wherein the second entity is a person and the indication of the call being made by or to the second entity is based on detecting at least one of a voice print, a facial recognition, a password, a fingerprint, and a retinal scan associated with the second entity.

3. The method of claim 1, wherein the second entity is a device and the indication of the call being made by or to the second entity is based on at least one of an off hook signal, a SIP Invite, a telephone number, an IP address, an email address, and a unique device identifier.

4. The method of claim 1, responsive to receiving the request from the first entity to send the notification based on the call, providing a way to indicate to the second entity whether or not to allow the request from the first entity to receive the notification of the call made by or to the second entity.

5. The method of claim 4, wherein the way for the second entity to indicate whether or not to allow the request from the first entity to receive the notification of the call made by or to the second entity is accomplished automatically based on comparing a rating of the first entity and a rating of a specific call, wherein the rating of the first entity and the rating of the specific call are set by the second entity.

6. The method of claim 1, wherein responsive to the call being made by or to the second entity, providing instructions to display the selection control option as a window, the window having one or more elements for the second entity to indicate whether or not to send the notification to the first entity of the call being made by or to the second entity.

7. The method of claim 6, wherein there are a plurality of requests to receive the notification of the call made by or to the second entity, the plurality of requests are from a plurality of users, and the window includes the capability for the second entity to select individual ones of the plurality of users to send the notification of the call, wherein selecting individual ones of the plurality of users by the second entity is accomplished based on at least one of the following: a group, a ranking, a type of call, and a rating.

8. The method of claim 1, wherein the selection of the at least one option provided via the second entity is received by the notification system in response to the second entity clicking an approval button associated with the request from the first entity.

9. The method of claim 1, further comprising the steps of:
   receiving a subject associated with the call;
   getting a description of the call;
   determining if the subject associated with the call matches the description of the call;
   responsive to the subject associated with the call matching the description of the call and based on the selection provided by the second entity, sending the notification to the first entity of the call being made by or to the second entity; and
   responsive to the subject associated with the call not matching the description of the call, not sending the notification to the first entity of the call being made by or to the second entity.

10. The method of claim 9, further comprising the steps of detecting a change in the description of an ongoing call, and responsive to detecting the change, repeating the steps of claim 9 for the changed description.

11. The method of claim 9, wherein the description is based on at least one of the following: a Session Initiation Protocol header, a calendar event, a selection by the second entity, a spoken phrase, a document, a subject line in an email, and a subject line in an Instant Message.

12. A system comprising:
   a call processor configured to receive an indication of a call being made by or to a specific entity, wherein the call is an audio or video call; and
   a notification system configured to receive a request from an inquiring entity to send a notification based on the call being made by or to the specific entity, provide, based on the request from the inquiring entity and in response to receiving the indication of the call being made by or to the specific entity, a selection control option to the specific entity, the selection control option including at least one option for selectively allowing or denying the request from the inquiring entity, determine, based on a selection of the at least one option provided via the specific entity, that the specific entity allows the request from the inquiring entity, and in response to receiving the selection provided via the specific entity, send a notification to the inquiring entity of the call being made by or to the specific entity.

13. The system of claim 12, wherein the specific entity is a person and the indication of the call being made by or to the specific entity is based on detecting at least one of a voice print, a facial recognition, a password, a fingerprint, and a retinal scan associated with the specific entity.

14. The system of claim 12, wherein the specific entity is a device and the indication of the call being made by or to the specific entity is based on at least one of an off hook signal, a SIP Invite, a telephone number, an IP address, an email address, and a unique device identifier.

15. The system of claim 12, wherein responsive to receiving the request from the inquiring entity to send the notification based on the call, the notification system is further configured to provide a way to indicate to the specific entity whether or not to allow the request from the inquiring entity to receive the notification of the call made by or to the specific entity.

16. The system of claim 15, wherein the way for the specific entity to indicate whether or not to allow the request from the inquiring entity to receive notification of the call made by or to the specific entity is accomplished automatically based on comparing a rating of the inquiring entity and a rating of a specific call, wherein the rating of the inquiring entity and the rating of the specific call are set by the specific entity.

17. The system of claim 12, wherein responsive to the call being made by or to the specific entity, the notification system is further configured to provide instructions to display the selection control option as a window, the window having one or more elements for the specific entity to indicate whether or not to send the notification to the inquiring entity of the call being made by or to the specific entity.

18. The system of claim 17, wherein there are a plurality of requests to receive the notification of the call made by or to the specific entity, the plurality of requests are from a plurality of users, and the window includes the capability for the specific entity to select individual ones of the plurality of users to send the notification of the call.

19. The system of claim 18, wherein selecting individual ones of the plurality of users by the specific entity is accomplished based on at least one of the following:
a group, a ranking, a type of the call, and a rating.

20. The system of claim 12, wherein the notification system is further configured to:
receive a subject associated with the call,
get a description of the call,
determine if the subject associated with the call matches the description of the call,
responsive to the subject associated with the call matching the description of the call and based on the selection provided by the specific entity, send the notification to the inquiring entity of the call being made by or to the specific entity, and
responsive to the subject associated with the call not matching the description of the call, not send the notification to the inquiring entity of the call being made by or to the specific entity.

21. The system of claim 20, wherein the notification system is further configured to detect a change in the description of an ongoing call, and responsive to detecting the change, the notification system is further configured to repeat the steps of claim 20 for the changed description.

22. The system of claim 20, wherein the description is based on at least one of the following: a Session Initiation Protocol header, a calendar event, a selection by the specific entity, a spoken phrase, a document, a subject line in an email, and a subject line in an Instant Message.

* * * * *